United States Patent [19]

Wach et al.

[11] Patent Number: 4,778,437
[45] Date of Patent: Oct. 18, 1988

[54] HEAVY DUTY V BELT

[75] Inventors: Andrew P. Wach; Stanley W. Olson, both of Lincoln, Nebr.

[73] Assignee: The Goodyear Tire & Rubber Company, Akron, Ohio

[21] Appl. No.: 485,570

[22] Filed: Apr. 15, 1983

[51] Int. Cl.⁴ .......................... F16G 5/06; F16G 5/14
[52] U.S. Cl. .................................... 474/260; 474/261
[58] Field of Search ............... 474/260, 261, 262, 250, 474/265

[56] References Cited

U.S. PATENT DOCUMENTS

| | | | |
|---|---|---|---|
| 2,336,084 | 12/1943 | Freedlander | 154/4 |
| 2,430,024 | 11/1947 | Luaces et al. | 474/261 |
| 3,464,875 | 9/1969 | Brooks et al. | 156/138 |
| 3,485,707 | 12/1969 | Spicer | 474/260 |
| 3,800,610 | 4/1974 | Wach | 474/250 |
| 3,941,005 | 3/1976 | Gardiner, III et al. | 474/265 |
| 3,968,703 | 7/1976 | Bellman | 74/231 C |
| 3,973,670 | 8/1976 | Spaar | 474/261 |
| 3,996,813 | 12/1976 | Henderson et al. | 474/261 |
| 4,019,399 | 4/1977 | Waugh | 474/250 |
| 4,126,053 | 11/1978 | Cicognani | 474/265 |
| 4,555,241 | 11/1985 | Takano et al. | 474/265 |

FOREIGN PATENT DOCUMENTS

| | | | |
|---|---|---|---|
| 0109990 | 6/1984 | European Pat. Off. | |
| 2505905 | 8/1976 | Fed. Rep. of Germany | |
| 2206823 | 6/1974 | France | |
| 2503305 | 10/1982 | France | 16/G5 |

Primary Examiner—Jerome W. Massie, IV
Assistant Examiner—Bruce M. Kisliuk
Attorney, Agent, or Firm—M. R. Dion, Sr.

[57] ABSTRACT

A V-type power transmission belt incorporating one or more monofilament layers transverse of and directly below the tensile members to provide transverse stiffness to the belt construction. The monofilaments are directly bonded to the rubber body of the compression section.

8 Claims, 1 Drawing Sheet

HEAVY DUTY V BELT

BACKGROUND OF THE INVENTION

This invention relates to heavy duty V-type drive belts commonly used in agricultural and variable speed applications including automotive traction applications. Such belts can find use in continuously variable transmissions for automobiles and in agricultural traction drives such as in a combine where high horsepower loads are being transferred from the power plant to the drive train. Because of the rigorous environment in which such belts operate and the extremely high tensile loads placed on the belt, such belts are generally made thicker, having a lower ratio of top width to belt thickness than V-type belts used for light duty applications. These heavy duty V-belts must exhibit considerable transverse rigidity in order to maintain the primary tensile members in an planar orientation to facilitate uniform load bearing across the width of the belt while the belt is under tension. The portion of a heavy duty V-belt which is subjected to substantial tensile stress is conventionally known as the tension section and the portion of the belt construction subjected to compressive stresses is known as the compression section. The belt bends or flexes about a neutral axis section which is located between the tension and compression section and is primarily composed of longitudinally oriented, substantially inextensible tightly twisted tensile bearing cords. In general, the tensile load put upon the belt is known to be directly proportional to the tendency of the tensile members to be distorted out of a substantially horizontal plane. The load bearing capability of a particular V-belt construction is primarily dependent on the degree of support which the compression section of the belt can supply to the tensile bearing members in the construction. Therefore, transverse stiffness is of primary importance in maximizing the power which can be conveyed by a heavy duty drive belt.

BACKGROUND ART

It is well known that various fiber reinforced rubber compositions when utilized in the compression section of the belt can provide improved support to the tensile members compared to non-fiber reinforced rubber compositions. The degree of stiffness which may be derived from rubber compounds is limited and has been found to provide insufficient transverse stiffness in belts employed in such high power transmission applications as continuously variable transmissions (C.V.T.) in automobiles or traction drives in combines. U.S. Pat. No. 3,485,707 discloses an industrial belt which utilizes a lateral stiffening means of at least one layer of uncrimped monofilaments located either in the tension or compression sections of the belt. The monofilaments are oriented transversely in the belt with cotton or textile binding elements being woven around substantially all of the monofilament surface. The monofilament layer is bonded into the belt construction by the adhesion of the binding elements to the elastomer. The monofilaments themselves have no substantial contact with the elastomer body of the belt. While the construction described in U.S. Pat. No. 3,485,707 might be suitable for low load power transmission applications, it would not be suitable for use in heavy duty power transmission applications due to the continual movement of the unbonded monofilaments inside of the belt construction which would produce frictional heat and result in high operating temperatures under load. These high operating temperatures cause early failure of the belt construction. In addition, the unbonded monofilaments located in the compression section of the belt would tend to "walk" out of the edge of the belt due to the compressive stresses which are continually placed on that portion of the belt. This tendency of the transverse monofilament to be forced out of the belt would be an additional cause of early failure in high load power transmission applications.

BRIEF SUMMARY OF THE INVENTION

This invention achieves the required transverse stiffness by incorporating in the compression section just below the tensile members at least one layer of monofilament which is securely bonded directly to the elastomer body of the belt. An aspect of the invention is a V-type power transmission belt exhibiting improved transverse stiffness comprising: an elastomeric body having a top surface and a bottom surface and including a tension section; a substantially inextensible neutral axis section below the tension section having one or more layers of tensile members disposed parallel to the top surface axis of said belt; a compression section bounded by the neutral axis section and the bottom surface of the belt and having one or more monofilament layers, said monofilament layers being composed of individual monofilaments disposed substantially perpendicular to the layer of tensile members, each said individual monofilament being securely bonded to the elastomer body over the entire length of each individual monofilament, said monofilament layers imparting transverse stiffness to said belt. The substantial transverse stiffness imparted by the monofilament layer allows the belt thickness to be reduced while still maintaining the load carrying capabilities of the thicker belt. The thinner cross section allows increased belt flexibility; decreased belt operating temperatures and increased belt life. In addition, use of the belts of this invention permits use of smaller diameter drive sheaves which increases speed variation on variable speed drives.

BRIEF DESCRIPTION OF THE DRAWINGS

Features of the invention will be better understood after consideration of the following description taken in conjunction with the accompanying drawings in which.

DETAILED DESCRIPTION OF THE INVENTION

Figure 1:
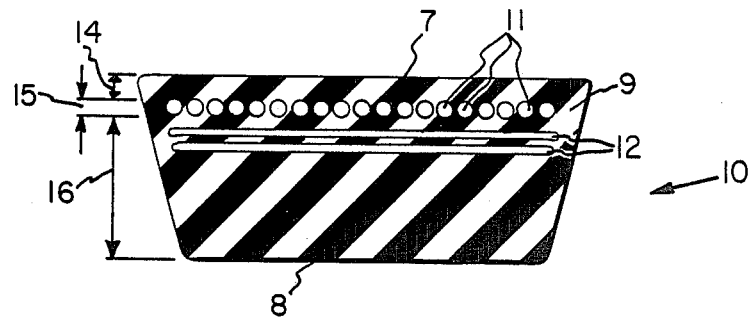
FIG. 1 is a cross sectional view of belt of the invention.

With reference to FIG. 1 there is illustrated a V belt 10 of generally trapazoidal shape having a top surface 7 and a bottom surface 8 comprising an elastomeric body 9 which includes tension, neutral axis and compression sections indicated by 14, 15 and 16 respectively. The neutral axis section 15 is composed of a plurality of longitudinally oriented and substantially inextensible tightly twisted cords which serve as tensile members 11. The tensile members may be composed of any material known to be useful for this purpose, such as polyester, nylon, steel, fiberglass, rayon or aramid. The neutral axis section 15 is bounded on the bottom by the compression section 16. In the compression section below the neutral axis section is positioned at least one layer of individual monofilaments 12 oriented substantially perpendicular to the tensile members 11 and parallel to the top surface 7. The monofilaments 12 may be composed of any suitable material such as nylon or polyester including polyethylene terephthalate or polybutylene terephthalate. The term monofilament specifically excludes crimped or twisted cord or fabric constructions as such members would not provide the degree of transverse stiffness desired in this invention. The diameter of the monofilament may vary over a broad range dependent upon the load carrying requirements of the belt. Preferably the monofilament would range from about 0.010 to about 0.150 inch (0.25 to 4.0 millimeters). The monofilament layers are held in a planar configuration by widely spaced pick yarns (not shown) which are present only for the purpose of holding the monofilament in the planar form until it can be incorporated into the belt construction. These pick yarns serve no structural purpose in the belt of this invention and could be eliminated completely if a suitable means for maintaining the planar orientation of the individual monofilaments in the layer prior to building of the belt could be devised.

Figure 2:
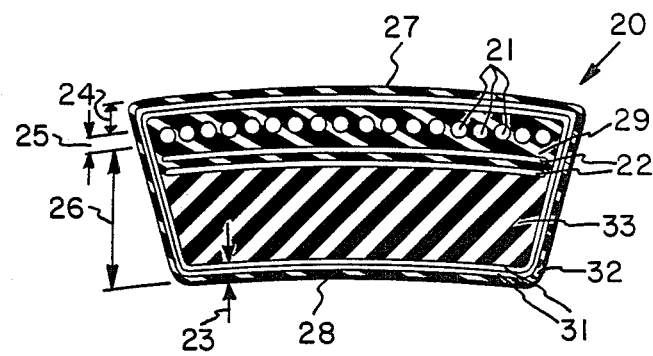
FIG. 2 is a cross sectional view of an alternate embodiment of the invention incorporating an arched, transverse cross section and protective fabric jacket.

Referring now to FIG. 2, this embodiment of the invention utilizes an arched, transverse cross sectional belt configuration 20 wherein the tensile members 21 are positioned substantially parallel to the arched top surface 27 and arched bottom surface 28 of the belt. This arched configuration is preferred for severe load, high power applications. There is a tendency for the center of the belt to distort downward under full load. The arched configuration assures that at full load a maximum number of tensile members are aligned in a flat plane, thus assuring more uniform load distribution across all tensile members. The tensile members 21 and the monofilament layers 22 may be selected as described above in FIG. 1 and in this embodiment of the invention may be embedded in a layer of rubber 29 which is compounded for toughness and strong adhesion to the tensile members and monofilaments. The belt 20 includes tension, neutral axis and compression sections indicated by 24, 25 and 26 respectively. These sections are located as described above in FIG. 1. The compression section 26 is preferably composed of a stiff rubber compound 33 which may be fiber reinforced to maximize its support of the structural layer above it when the belt is under load.

The embodiment shown in FIG. 2 may optionally have a heavy rubber impregnated fabric jacket 23 surrounding the entire belt structure. The fabric jacket 23 is composed of one or more fabric plies 31 as required by the particular application. The plies 31 may be composed of any suitable fabric construction including but not limited to, a tire cord fabric, any knitted or woven fabric. The woven fabric can be square woven or high angle fabric. The plies may optionally be impregnated and surrounded by a tough, abrasion resistant rubber compound 32. The fabric jacket 23 which completely surrounds the body of the belt set forth in FIG. 2 is highly desirable for improving the life of a power transmission belt by minimizing the abrasion and wearing away of the lateral surfaces of the belt by the frictional contact with the sheave flanges. This jacket 23, while desirable is not essential to the operation of this invention.

Figure 3:
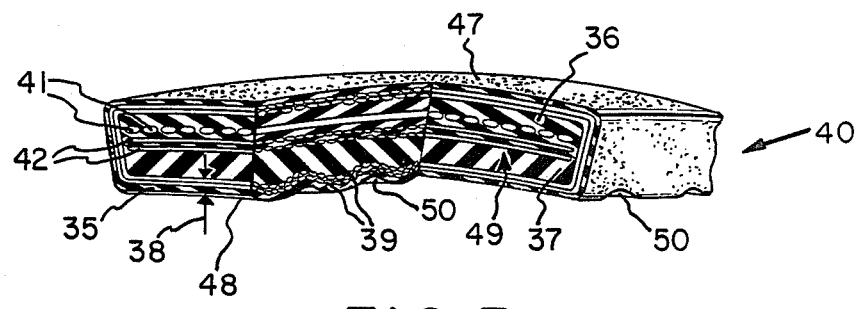
FIG. 3 is a perspective sectional view of a belt portion of the preferred embodiment.

FIG. 3 illustrates a preferred embodiment of this invention. The belt 40 is an arched, transverse cross section belt with an arched top surface 47 and arched bottom surface 48. The belt 40 has an elastomeric body 49 which is a composite of two elastomeric layers 36 and 37. The upper elastomeric layer 36 is nearest the top surface 47 and contains a layer of tensile members 41 arranged substantially parallel to the top surface 47. Spaced below the tensile members 41 is at least one layer of individual monofilaments 42 oriented perpendicular to the tensile members 41 and transverse to the direction of travel of the belt. Layer 36 may be principally composed of any elastomer or blend of elastomers known to be suitable for use in power transmission belts, including various natural and synthetic rubbers. The elastomer of this layer is compounded to assure a strong bond between the elastomer and the tensile members and the individual monofilaments. The lower elastomeric layer 37 may be composed of the same elastomers as the upper elastomeric layer 36 or a different elastomer or blend of elastomers. The elastomer of this layer is compounded to give maximum support to the monofilament layers and tensile members above it in the construction. One preferred ingredient in the elastomer of this layer is short, natural or synthetic fibers which are included to give stiffness to the layer while maintaining an optimal degree of flexibility. A fabric jacket 38 may optionally be incorporated in the belt construction. The fabric jacket 38 shown has two layers of fabric 39 impregnated with an abrasion resistant rubber compound 35.

The embodiment of the invention shown in FIG. 3 incorporates a plurality of substantially evnnly spaced transverse corrugations 50 in the bottom surface 48 of the belt. Such transverse corrugations 50 are desirable in a heavy duty V belt for the purpose of improving flex fatigue of the belt, minimizing bottom cracking which results from the compressive stresses applied to the lower-most portions of the belt during travel around the radius of the various sheaves in the power transmission system and improving belt flexibility. The transverse corrugation configuration may include molded corrugations, machined or molded grooves and notches. This feature, while desirable for long service life is not essential to the operation of this invention and is well known in the art.

The principle of this invention may be employed in the design and manufacture of belts of varying configuration. The preferred embodiment of this invention can be utilized to transfer the high horsepower required in an agricultural traction drive, rotor drive or cylinder drive. It may be also utilized in so-called CVT or continuously variable transmissions used in automobile drive trains. The requirements of such high horsepower applications are such that the lateral stiffness imparted by the monofilament layers of this invention enables the belts to have very long service life compared to belts of the prior art.

The method for building the belts of this invention includes a critical step involving the alignment of the many individual monofilaments into a substantially planar layer prior to the incorporation of this layer into the structure of the belt during the building operation. One preferred method for maintaining the parallel planar orientation of the monofilaments is embedding the monofilament layer in an uncured rubber compound to form a dimensionally stable monofilament layer which can be easily manipulated during the manufacturing process. A calender may be used to embed the monofilament layer in the rubber compound. The rubber compound should be compounded for toughness as well as strong adhesion to the individual monofilaments. Once the monofilament layer has been properly prepared the belts of this invention may be built and cured by methods well known in the art for producing such power transmission belts. The preferred methods are those which produce belts having an endless configuration. A preferred method for manufacturing an endless power transmission belt exhibiting improved transverse stiffness includes the steps of applying a layer of uncured rubber compression compound to a preferably cylindrical mandrel of the appropriate length and diameter for the production of the desired endless belt. The rubber compression compound is compounded by methods known in the industry for use in the compression section of a power transmission belt. The planar monofilament layer prepared as described above is placed in intimate contact with the layer of uncured rubber compression compound on the mandrel so that the individual monofilaments are oriented, transverse of the direction of travel of the finished belt. This orientation is parallel with the axis of rotation of the mandrel. The next step is the application of the desired tensile member layer or layers over the planer monofilament layer. The most preferred method of application of the tensile member involves the spiral application of a continuous filamentary tensile member such as a tightly twisted polyester cord of the appropriate dimension for the finished belt load requirements. The tensile member is spiraled onto the mandrel in a manner which will space the individual tensile members the desired distance apart in the finished belt. If a cut-edge belt is being manufactured, a tough rubber compound useful for covers may optionally be wrapped over the previously applied tensile member layer. If a fabric jacketed belt is being built, the fabric jacket is applied surrounding the integral belt composite and subsequently cured. If a jacketed belt is not being produced the integral belt composite is cured with no intervening steps and subsequently cut to the desired width and dimension.

COMMERCIAL APPLICABILITY

An endless belt for use in a combine rotor drive was built in accordance with the embodiment described in FIG. 3. The belt dimensions were a 2-½ inch (63.5 mm) top width and a 0.88 inch (22 mm) thickness. The cross-section of the belt was an arched, transverse configuration as shown in FIGS. 2 and 3, such configuration being utilized in order to achieve maximum power transmission capabilities. It should be appreciated that under minimum load conditions the belt cross-section is in the arched configuration, but under maximum loads the center portion of the belt will tend to deform downward especially when the flanges of the drive sheave are in compressive contact with the side walls of the belt. Under such high load conditions the cross section of the belt assumes a trapezoidal configuration with a substantially flat upper surface. This characteristic assures that under such high load conditions a maximum number of tensile bearing members are aligned in a plane substantially parallel with the axis of travel of the belt, thus assuring uniform distribution of load across all tensile members in the belt construction. A single layer of tightly twisted polyester cords oriented parallel to the longitudinal axis of the belt were used as the tensile member of the belt. Underlying the tensile members and below the neutral axis were located two parallel layers of nylon 1.0 mm (40 mil) monofilaments embedded in a rubber compound formulated for strong cured adhesion to the monofilament surface. A fiber reinforced rubber compound was used for the portion of the compression section below the monofilament layers. Two layers of rubber impregnated tire cord fabric were used to form the fabric jacket which completely surrounded the peripheral surfaces of the elastomeric body of the belt. Transverse corrugations as shown in FIG. 3 were molded into the bottom peripheral surface of the compression section of the belt. This belt was utilized in a 240 horsepower combine rotor drive. The improved lateral stiffness imparted by the belt construction of this invention provided exceptionally long service life in this high horsepower application.

The improved life of belts of this invention was illustrated in side by side comparative testing of belts of this invention against a prior art belt construction without the transverse monofilament reinforcement. Endless belts were built having top widths of 1.75 inch (44.5 mm), thickness of 0.625 inch (15.9 mm) and overall length of 53 inches (1.35 meters). Belts of conventional construction will be referred to as the control while belts of this invention will be referred to as transverse reinforced. The transverse reinforced belts contained two layers of 0.040 inch (1 mm) nylon monofilaments laid transversely below the twisted polyester cord tensile members. The belts were covered by two layers of rubber impregnated tire cord fabric.

The belts were subjected to an accelerated dynamometer test in which the belts were stretched between a drive pulley and a driven pulley where the drive pulley was one-half the diameter of the driven pulley. The belts were run at controlled tension and speed until they failed. The control belt ran for an average of 120 hours to failure while the transverse monofilament reinforced belts ran for an average of 270 hours before failure.

While a limited number of representative embodiments of the invention have been shown in detail and described it will be apparent to those skilled in the art that various changes and modifications may be made therein without departing from the scope of the invention as covered by the appended claims.

What is claimed is:

1. A V-type power transmission belt exhibiting improved transverse stiffness comprising:
    an elastomeric body having a top surface and a bottom surface and including a tension section;
    a substantially inextensible neutral axis section below the tension section having one or more layers of tensile members disposed parallel to the top surface of said belt;
    a compression section bounded by the neutral axis section and the bottom surface of the belt having one or more monofilament layers, said monofilament layers being composed of individual monofilaments disposed substantially perpendicular to the layer of tensile members, each said individual monofilament being securely bonded to the elastomeric body over the entire length of each individual monofilament, said monofilament layers imparting transverse stiffness to said belt.

2. A V-type power transmission belt of claim 1 wherein said belt is of an arched transverse section, low ratio top width to thickness configuration.

3. A V-type power transmission belt of claim 1 further comprising a fabric jacket completely surrounding said elastomeric body.

4. A V-type power transmission belt of claim 1 wherein said bottom surface of said belt includes evenly spaced transverse corrugations on the peripheral surface of said compression section furthest removed from said neutral axis section.

5. A V-type power transmission belt of claim 4 wherein said transverse corrugations are transverse molded notches which improve the longitudinal flexibility of said belt.

6. A V-type power transmission belt of claim 1 wherein said belt is an endless belt construction.

7. A V-type power transmission belt of claim 1 wherein said individual monofilaments may range from about 0.25 to about 4.0 millimeters in diameter.

8. A V-type power transmission belt of claim 7 wherein said individual monofilament is composed of nylon or polyester.

* * * * *